UNITED STATES PATENT OFFICE.

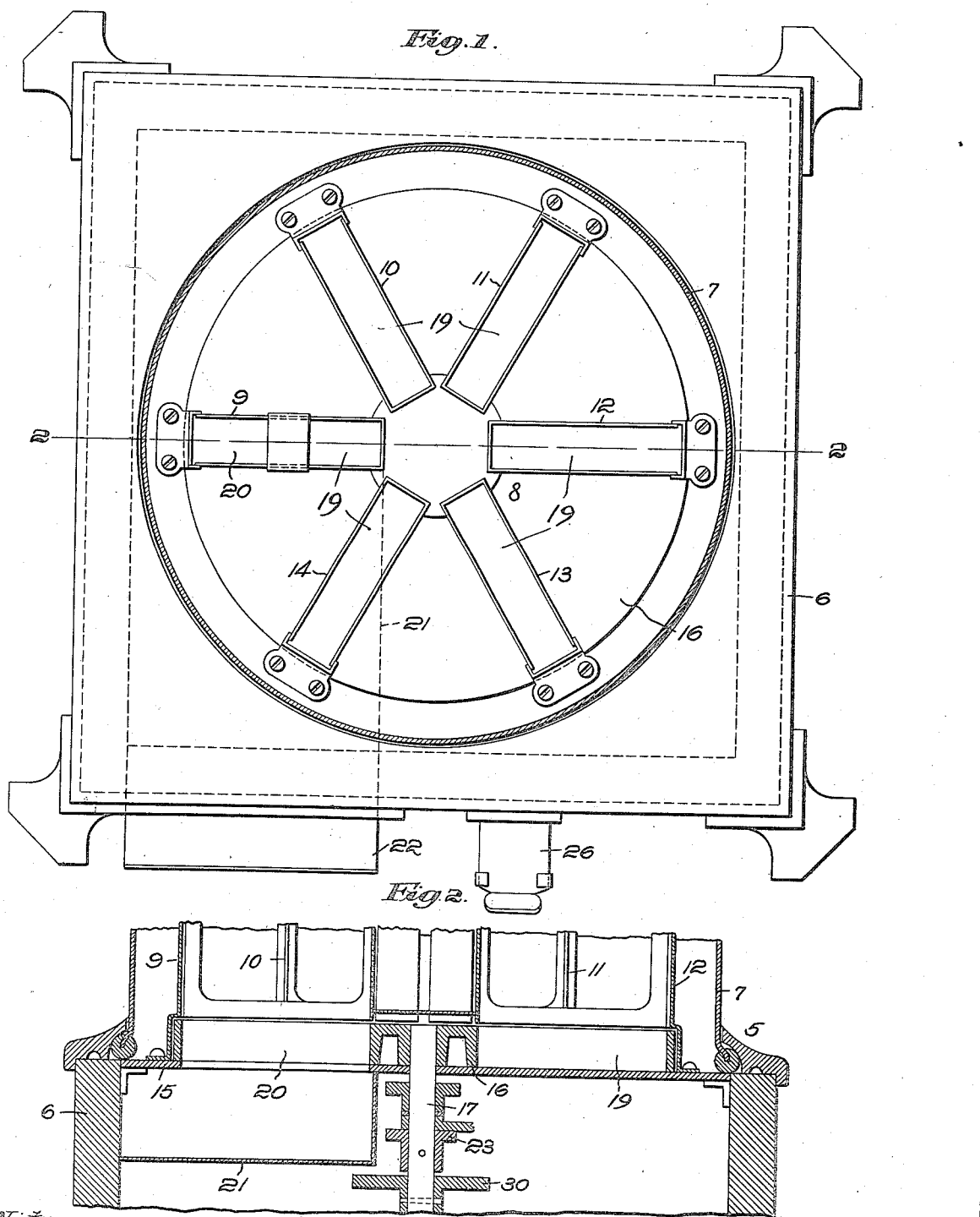

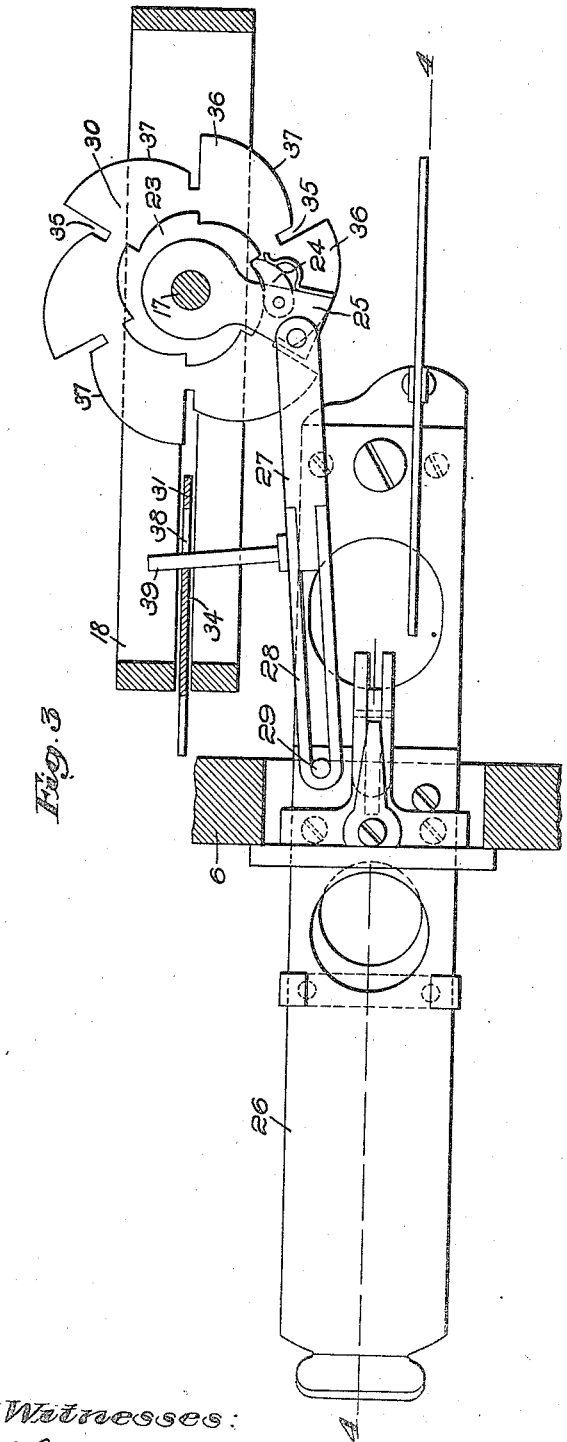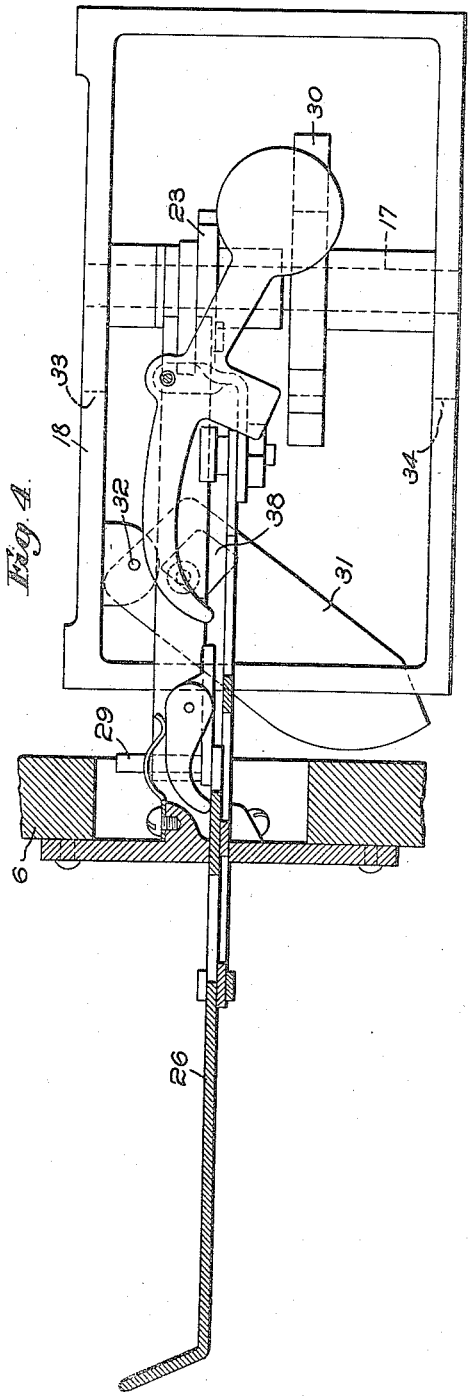

ASMUS PHILIPPSEN, OF BRIDGEPORT, CONNECTICUT, ASSIGNOR TO THE HAWTHORNE MANUFACTURING COMPANY, INC., OF BRIDGEPORT, CONNECTICUT, A CORPORATION OF CONNECTICUT.

DISPENSING APPARATUS.

1,151,532.  Specification of Letters Patent.  Patented Aug. 24, 1915.

Original application filed June 4, 1912, Serial No. 701,556. Divided and this application filed August 29, 1912. Serial No. 717,714.

*To all whom it may concern:*

Be it known that I, ASMUS PHILIPPSEN, a citizen of the United States, and a resident of Bridgeport, in the county of Fairfield and State of Connecticut, have invented an Improvement in Dispensing Apparatus, of which the following description, in connection with the accompanying drawings, is a specification, like characters on the drawings representing like parts.

This invention relates to dispensing apparatus, and will be best understood by reference to the following specification when taken in connection with the accompanying illustration of one specific embodiment thereof, while its scope will be more particularly pointed out in the appended claims.

This application is a division of my co-pending application, Serial No. 701,556, filed June 4, 1912.

In the drawings:—Figure 1 is a plan, partly in section, of a dispensing apparatus embodying my invention; Fig. 2 is a sectional view, partly broken away, on line 2—2 of Fig. 1; Fig. 3 is a detail plan on an enlarged scale of the carrier rotating and locking mechanism; and Fig. 4 is a sectional view partly in elevation on line 4—4 of Fig. 3.

Referring to the drawings, and to the specific embodiment of my invention which I have there disclosed for illustrative purposes, I have there shown a casing 5 which may be of any suitable construction, but which herein comprises a base portion 6 surmounted by a superstructure, preferably consisting of a glass dome 7, which may be supported upon and secured to the base portion in any suitable manner. This casing serves to inclose and protect the mechanism and the supply of articles dispensed by the machine.

Located within the casing and preferably within the glass dome so as to be visible through the latter is a magazine 8, which may be of any suitable construction, but herein comprises a plurality of compartments 9, 10, 11, 12, 13 and 14, radially disposed about the center and supported in any suitable manner, as, for example, upon a supporting plate 15 surmounting the base portion 6. These compartments with the exception of the compartment 9 serve to hold columns of the articles to be dispensed. The compartment 9, however, will either be a dummy compartment having no articles placed therein, or it may, if desired, be omitted, for a reason which will be presently explained, but for the sake of preserving the symmetrical appearance of the magazine, I prefer to retain the compartment referred to as a dummy compartment. If desired, the walls of these compartments may be apertured, as shown in Fig. 2, for the purpose of providing a light construction and also exposing the articles therein to view.

The columns of articles in the magazine may be supported in the latter and fed therefrom to the delivery point by any suitable means, but I have herein chosen to employ for that purpose a rotatable carrier 16 located beneath the magazine and mounted to rotate about a vertical axis. To this end, the carrier 16 is preferably secured to a vertical shaft 17 journaled in suitable bearings in a bracket 18 depending from the supporting plate 15. The carrier has suitable provision for receiving the articles from the magazine and delivering the same to the delivery point, and for this purpose is preferably provided with a plurality of apertures 19 corresponding in number to the number of compartments of the magazine and placed radially in position to normally register therewith, as shown in Figs. 1 and 2.

It will thus be seen that when the various compartments of the magazine are filled with packages, the lowermost package in each compartment will rest in one of the apertures in the rotary carrier, the latter for this purpose being made approximately of the same thickness as the packages, so that as the carrier is rotated, the packages carried thereby will pass from beneath their respective columns of packages in the compartments, and the columns will be supported by the imperforate portions of the carrier. The packages are supported in the apertures in the carrier by the supporting plate 15 hereinbefore referred to until they arrive one by one at the selected delivery point, at which said plate is provided with a delivery aperture 20 through which the articles may drop into suitable delivery means, herein a chute 21, the latter having an outlet 22 located externally of the casing. Assuming, therefore, that a step-by-step, rotative movement is imparted to the carrier by suitable mechanism, such for example, as that hereinafter described, through an angular distance equal to the angular distance between the compartments of the magazine and the apertures in the carrier, the articles will be discharged from the apertures of the carrier successively as they register with the aperture 20 of the supporting plate 15. As the apertures are thus emptied, they will pass successively beneath the compartment 14 and will receive new packages from the latter. The packages thus received will be carried along beneath the remaining compartments of the magazine, and will finally be discharged into the chute, as above explained. When, however, the supply of packages in the compartment 14 becomes exhausted, the carrier will then begin to draw its supply from the compartment 13, and when the latter is exhausted, the carrier will commence to draw its supply from the compartment 12, and so on until all the compartments have been emptied. It will readily be seen that by this arrangement, a magazine of very large capacity and yet of comparatively small dimensions can be provided.

A step-by-step, rotative movement may be imparted to the carrier by suitable mechanism, herein a ratchet 23 secured to the shaft 17 and driven by a spring pressed pawl 24 pivoted on a pawl carrier 25, the latter mounted to oscillate upon the shaft. This pawl carrier may receive an oscillatory motion from a suitable actuator 26 through any suitable means, herein a link 27 pivoted at one end to the pawl carrier and having in its other end a slot 28, in which is located a pin 29 carried by said actuator.

I preferably provide suitable means to prevent overtravel of the article carrier 16 and to position and lock the latter with reference to the magazine and the delivery opening. To this end, I preferably provide a locking and positioning disk 30 secured to the shaft 17 and a coöperating locking plate 31, the latter being preferably pivoted at 32 on the bracket 18. Preferably the bracket 18 is provided at its upper portion with a slot 33 to receive the upper end of the locking plate 31 and is provided at its lower portion with a slot 34 to receive the lower portion of the locking plate. By this means, the locking plate, while free to be swung about its pivot radially with respect to the positioning disk 30, is effectually held against lateral movement. The positioning disk 30 has suitable provision for receiving the locking plate 31, herein being provided for this purpose with a plurality of radial slots 35, corresponding in number to the apertures in the article carrier 16. These slots form a plurality of teeth 36, which are preferably backed off somewhat, or, in other words, are curved or beveled inwardly at 37 to permit the locking plate 31 to be gradually advanced toward the center of the positioning disk 30, during the rotative movement of the latter. Consequently, when the pawl and ratchet mechanism rotates the shaft through an angular distance equal to the angular distance between two of the articles receiving apertures of the article carrier, the next tooth of the positioning disk will bring up against the locking plate, and the latter will enter into the slot 35, thus positively locking the positioning disk and consequently the article carrier. In this way the article carrier is caused accurately to register with the magazine and with the delivery opening.

The locking plate 31 may be carried into and out of coöperative engagement with the positioning disk 30 by suitable means, the same being herein provided for this purpose with an aperture 38, which receives a pin 39 carried by the link 27, so that as the latter is reciprocated under the influence of the actuator 26, the locking plate will be correspondingly actuated. In the operation of the mechanism the actuator 26 is pushed inwardly to its fullest extent, thus acting through the pawl and ratchet hereinbefore described to impart to the article carrier a partial rotative movement equal to the distance between two of the apertures in the article carrier, thus causing the delivery of the article from the carrier into the delivery chute, the carrier being properly positioned and locked at this moment by the coöperative action of the positioning disk and its locking plate.

While I have herein shown and described one form of my invention for illustrative purposes and have disclosed and discussed in detail the construction and arrangement incidental to one specific embodiment thereof, it is to be understood that the invention is limited neither to the mere detail of the relative arrangement of parts, nor to its specific application herein shown, but that extensive deviations from the illustrative form or embodiment of the invention may be made without departing from the principles thereof.

Having thus described one embodiment of my invention, what I claim is:—

1. In a dispensing apparatus, the combination of a magazine for the articles to be delivered, a rotary carrier adapted to transfer the articles from the magazine, means for rotating said carrier, and means including a positioning disk and a coöperating locking member for locking the said carrier against rotation in either direction and in proper position to receive articles from said magazine.

2. In a dispensing apparatus, the combination of a magazine for the articles to be delivered, a rotary carrier adapted to transfer the articles from the magazine, means for rotating said carrier, and means including a radially slotted positioning disk, and
5 a coöperating locking plate for locking said carrier in proper position to receive articles from the magazine.

In testimony whereof, I have signed my name to this specification, in the presence of two subscribing witnesses.

ASMUS PHILIPPSEN.

Witnesses:
EARL HORACE HAWTHORNE,
ELLSWORTH A. HAWTHORNE.